United States Patent Office 3,322,865
Patented May 30, 1967

3,322,865
PROCESS OF MANUFACTURING REFRACTORY FIBERS
Joseph E. Blaze, Jr., Alliance, Ohio, assignor to The Babcock & Wilcox Company, New York, N.Y., a corporation of New Jersey
No Drawing. Continuation of application Ser. No. 345,855, Feb. 19, 1964. This application Nov. 10, 1966, Ser. No. 593,585
7 Claims. (Cl. 264—.5)

This application is a continuation of my previous application Ser. No. 345,855 filed Feb. 19, 1964, and now abandoned.

This invention relates to a process of producing fibers suitable for use at high temperatures, and more particularly to a process of producing polycrystalline refractory inorganic oxide fibers having appreciable strength at use temperatures in excess of 2000° F.

Glass fibers are now produced by fiberizing a viscous bath of a wide range of refractory oxide starting materials but the temperature use limit of such glass fibers normally does not exceed 2000° F. This is not because the melting temperature of the material has been reached, but rather because such fibers lose most of their strength through undergoing recrystallization at the higher temperatures.

It has been found that the recrystallization problem can be eliminated by fabricating fibers which are already in the crystalline form. Such crystalline fibers can possess a considerable degree of strength both at ambient and at high temperatures and the refractoriness of the fiber can be controlled by using a pure or combinations of pure ceramic materials having high temperature melting points.

The strength and acceptability of a crystalline fiber depends to a large degree on the diameter of the filament and to a lesser degree on its length to diameter ratio. The mechanical flexibility in a fiber is important in forming products from the fibers. Reducing the maximum cross-sectional dimension of the fiber tends to increase its overall flexibility as well as to improve its strength properties.

Special methods have been devised for forming such high temperature fibers. One such method is to heat a refractory oxide to a temperature above its melting temperature and fiberize it by conventional means. However, very few of the high melting oxides have a viscosity suitable for the fiberizing by conventional methods. Furthermore, such methods involve high power requirements for obtaining the desired temperatures and are considered commercially uneconomic.

It has also been proposed to form fine fibers from a melt of high melting temperature material by vapor deposition and analagous methods, but these processes inherently have very low production rates and are thus not well suited for commercial production.

Another method is to prepare an aqueous solution of one or more inorganic metal salts, heating the solution to form a colloidal dispersion stable in the remaining liquid, depositing a thin film (10–50 microns thick) of the solution while in a very low viscosity condition (6–14 centipoises) on a clean glass-smooth solid surface to which the material will not adhere, drying the resultant film by heating in an oxidizing atmosphere to a temperature sufficient to drive off the solvent and to disrupt the film into ribbons of rectangular cross-section having widths of 2–30 mircons.

In accordance with the present invention, polycrystalline fibers can be made by forming a solution of a soluble metal salt which is characterized by its high viscosity, its high degree of solubility in the solvent selected, its stability in a concentrated viscous condition, its ability to decompose to its oxide on being heated to a sintering temperature, and its low cost as commercially pure material. Sulphates, chlorides, phosphates, and nitrates of aluminum, chromium, magnesium, thorium and zirconium, and mixtures thereof, have been found suitable metal salts for this purpose. The sulphates and chlorides are preferred because of their lower cost. Various solvents may be employed such as the water of crystallization of the salt, alone or supplemented by additional mechanical water.

The salt or mixture of salts is dissolved and the solution concentrated to the desired viscosity by heating to a relatively low temperature, e.g. in the range of 100–450° F., until the amount of solvent is reduced the desired amount. An essential feature of the process is that the concentrated solution while at substantially room temperature will have the fiberizing characteristics of a molten glass, particularly the ratio of viscosity to surface tension. The solution should also be stable at room temperature when at the desired viscosity. With the desired stability, the salts or solids in the solution will not segregate by gravity in a 24-hour period, for example; the solution will not recrystallize for at least 24 hours, nor be affected by slight changes in temperature, impurities or humidity of the surrounding space. Stability of the solution is desirable for good reproducibility and for storage and handling of the low temperature solution before actual fiber forming. Filaments can be made from solution which recrystallize in a relatively short time but with more difficulty and less convenience.

Another feature of the solutions of the invention process is that they should contain as high a solid content as possible, i.e. the percent of oxide or ceramic that can be formed from the salt when heated. For example, $Al_2(SO_4)_3 \cdot 18H_2O$ has a solid content of approximately 15% $Al_2O_3$ and thus a fiber made from this exact composition would have to shrink to about one-sixth its volume to obtain a full density $Al_2O_3$ fiber. The higher the solid content, the lower the porosity during processing and thus the greater the fiber strength. A high solid content also insures longer filaments.

Another essential requirement of the fiber drawing composition is that it contain a compound that will decompose and densify into a refractory oxide or mixture of oxides by heating the fibers at a temperature substantially below the melting temperature of the oxide formed. For example, a starting composition of 70% $Al(H_2PO_4)_3 + 30\%$ $Al_2(SO_4)_3$ mixed with water forms a very satisfactory composition. This composition will decompose on heating to compounds containing aluminum, phosphorus and oxygen including $Al_2O_3$ and $AlPO_4$, representing 48% of the starting salts. Fibers of this material reach a very dense condition when heated at temperatures as low as 1600° F., yet have a melting point about 3600° F.

It is essential for commercial use that the fiberizable material be in a condition and particularly at a viscosity which would make it suitable for use in a large volume commercial fiberizing device and process such as blowing a thin stream of the melt, drawing it into individual continuous filaments, or spinning the solution in a cotton-candy machine. For this reason, the heating is continued until the solution has a viscosity in the range of 1 to 1000 poises and preferably one suitable for the preferred fiberizing method employed. For example, if the viscous solution is to be withdrawn through an orifice and blown, the viscosity should be in the range of 2 to 50 poises. A range of 50 to 150 poises would be suitable for spinning the withdrawn solution, while a viscosity of 100 to 1000 poises would be suitable for drawing a mono-filament.

The space conditions surrounding the fiber formation are also of importance. The removal of the solvent is extremely important. The salts or colloidal mixtures are moisture-sensitive in that removing moisture increases the viscosity to a point that the solution tends to turn into a true rigid glass. The large surface area possessed by the fibers enables the fibers to dry sufficiently if the moisture content (dew point) of the surrounding air is low enough. If, however, the moisture content of the air is too high, the fibers will not become rigid but may, in fact, absorb sufficient water from the air to convert them into a formless mass. Control of the drying air is therefore necessary to ensure the proper moisture content. Contact between the fibers while in a dried state should be minimized and the fibers dried as quickly as possible.

The fiberizing of such solution should take place in a space having a relative humidity less than 60% and preferably in the range of 20 to 30%. With humidities above 60%, the fibers would absorb sufficient moisture to cause them to remelt into an agglomerated mass. The temperature of the space is less important and may be in the range of 40 to 300° F., but preferably is at a normal room temperature of 65 to 80° F.

Removing the volatiles and rendering the fibers crystalline and strong by heating is the last step in the fiber production. The drying step removes most of the water in the fibers and even some of the anions in the salt solution but higher temperatures are needed to convert the fibers into a crystalline ceramic form. After drying the fibers, they are heated slowly to the temperature where the included salts decompose. This temperature depends on the composition of the salts used but is in the range of 800–2500° F. and preferably in the range of 100–1400° F. For example, fibers containing $Al_2(SO_4)_3$ should be heated to about 1400° F. and held at that temperature until all of the $SO_2$ is driven off, leaving fibers consisting essentially of $Al_2O_3$.

After the volatiles are removed and conversion to the oxide ensured, the final sintering is designed to give the fibers maximum density without gross crystal growth. Fibers with large crystals tend to be weak due to impurities concentrating at the grain boundaries as the crystal growth occurs. The fibers are crystalline and highly refractory after this final heating.

In general, polycrystalline oxide fibers such as $Al_2O_3$, $Al_2O_3 \cdot AlPO_4$, $MgAl_2O_4$, $MgO$, $ThO_2$, $ZrO_2$, $ZrO_2+CaO$, $ZrO_2+MgO$ and $ZrO_2+SiO_2$ have been successfully made by the method of this invention from inorganic salt solutions, sols, colloids, or combinations of such materials. The process is usable with any fiber forming mass which will act at room temperature exactly like a molten gas, in that the mass will be viscous, stable, transformable into a rigid solid and made of material of colloidal size or less.

The fiber products of the described process are suitable for use at temperatures above 2000° F. They are chemically inert and non-reactive under designed use conditions. Aluminum oxide ($Al_2O_3$) fibers so made have been tested at 3300° F. without any noticeable change in the appearance of the fibers while zirconium oxide fibers having a theoretical melting temperature approximating 4900° F. have been used in the range of 3800–3900° F. The fibers are of crystalline formation with a maximum diameter less than 20 microns and usually in the 1–7 micron range. As compared to crystalline fibers made by other processes, the present fibers have no practical length limitations. The availability of relatively cheap suitable starting materials, the relatively low heat requirements of the process, and the adaptability for use with commercial fiberizing equipment, combine to provide a low cost method of making high temperature refractory fibers.

The following specific examples will further illustrate the invention and are to be regarded as illustrative of but a few of the many possible variations in materials, concentrations and procedures intended to be constructed within the scope of the invention. All "parts" and percentages stated herein are by weight.

*Example 1.—$Al_2O_3$ fibers*

Aluminum oxide fibers having a diameter of less than 1 micron to 10 microns and lengths up to 10 inches were made with the following procedure: 200 gms. of technical grade basic aluminum acetate hydrate were dissolved in 200 ml. of hot triple distilled water. The batch temperature was kept below 170° F. to avoid precipitation of the acetate and thereby clouding of the solution. After complete solution had taken place, 100 gms. of technical grade aluminum chloride ($AlCl_3$–Baumé 32°) was slowly added to the acetate solution. The addition of the chloride provided the solution with a higher percentage of aluminum ions and thus a higher solid content in the fiber. A high solid content is essential to maintain the fiber length during the subsequent sintering process and provide a non-porous finished product. The pure acetate solution contains only 18% $Al_2O_3$ when at the proper consistency for forming fibers. At the same viscosity, pure aluminum chloride solution has an $Al_2O_3$ content of 18% but is not stable and cannot be readily formed into fibers. Mixing the chloride with the acetate allows further concentration for the same viscosity and thus provides a stable solution with an $Al_2O_3$ content of about 25%. About 5 gms. of magnesium chloride can be added to the foregoing mix. This chloride will convert to MgO and this oxide helps in retaining small crystallite size in the fiber. Contamination of the solution mix is carefully avoided. If necessary, the solution can be filtered to remove any solid impurities.

The batch was then gently heated at temperatures below 170° F. until a room temperature viscosity of 50 to 150 poises were reached. At this stage, the solution had an appearance of a clear yellowish liquid. The viscosity of the batch was then checked to determine whether it was in the desired range for the method of fiberizing to be employed. The batch was then introduced into a cotton-candy machine in which it was spun. A large amount of very fine fibers was rapidly produced. The fiber forming was done in a room in which the relative humidity was about 25% and a temperature in the range of 65 to 80° F. The collected fibers were then placed in a refractory tray and dried for several minutes at 200° F. in a laboratory dryer. At this stage the solid content of the dried fibers had been increased to slightly over 55%.

The next step was calcination of the dried fibers. The fibers were heated rather rapidly in an oxidizing, still atmosphere to about 1000° F. at a rate of temperature increase of 1000° F. per hour. This heating rate was slowed to about 500° F. per hour with further heating to a temperature in the range of 1500–1600° F. and maintained at that temperature for from 5 to 10 minutes. The fibers initially had a black or grey color but when the soaking time and/or temperature was increased, the fibers became a pure white color.

The resulting $Al_2O_3$ fibers were checked optically for flaws, fiber diameter and density. They had a clear transparent appearance with zero porosity. X-ray inspection indicated that the crystallite sizes were so small that X-ray could not determine their crystal form. Heating the fibers to 2800° F., however, increased the crystallite size and gave an X-ray pattern for alpha alumina. The aluminum oxide fibers so formed have a theoretical melting temperature of 3723° F. They were found to be usable at temperatures of 3300° F. without any noticeable change in fiber appearance.

*Example 2.*—$Al_2O_3 \cdot P_2O_5$ *fibers*

The described process was also successfully used to make $Al_2O_3 \cdot P_2O_5$ fibers which have a melting point above 3600° F. 25 gms. of $Al_2(HPO_4)_3$ and 75 gms. of $Al(H_2PO_4)_3$ were mixed with an equal weight of distilled water. The pH of the mix was adjusted with phosphoric acid to give a pH in the range of 2.5 to 2.7 to aid the completion of the solution. The mix was then heated until complete solution was obtained while the water was maintained at the same starting volume. Once the solution was clear, commercial grade $AlCl_3$ of Baumé 32° to 36° was added, this being equivalent to 5 gms. of contained $Al_2O_3$. This amount of oxide represented about 40 gms. of chloride solution. The mixture was then heated at a temperature between 300 to 350° F. until the desired viscosity was obtained. Boiling or mechanical mixing was avoided during the period of heating to avoid entrapping bubbles in the mix. The desired viscosity was approximately 100 poises for this combination of salts at room temperature. This viscosity gave the liquid the appearance of a clear corn syrup. It had a solid content of approximately 45%.

The mix was then fiberized by the spinning operation described. The relative humidity was kept below 40% to avoid absorption from the air. During drying with exposure only to low humidity air, it was calculated that the solid content of fibers approached 65%.

After forming, the fibers were transferred to an electric kiln and heated to 1000° F. in one hour. They were then held at this temperature 15 minutes. The resulting fibers have an alumina content of approximately 60% by weight, the majority of this alumina being in the form of $Al_2O_3 \cdot P_2O_5$ or $AlPO_4$. Under the microscope, the fibers had a solid glassy look with a fiber diameter usually less than five microns. The materials used have a melting temperature of 3600° F. and the fibers were found to be usable at a temperature of 3300° F.

*Example 3.*—*Stabilized $ZrO_2$ fibers*

A commercial grade zirconium acetate solution containing 22% equivalent $ZrO_2$ was first screened through a 400 mesh stainless steel screen to remove insoluble impurities. The liquid was light amber in color and then mixed with ⅓ its weight of zirconium oxychloride hexahydrate. A typical batch was 300 gms. acetate solution and 100 gms. oxychloride. To this mix calcium acetate, magnesium acetate or magnesium chloride hydrate may be added as the source of an oxide capable of rendering the zirconia stabilized. For this purpose, 20 gms. of magnesium acetate was added to give an MgO-stabilized $ZrO_2$ fiber. (Other additives such as colloidal silica can be introduced to form other compounds with $ZrO_2$ or additives can be entirely eliminated to give a so-called unstabilized $ZrO_2$ fiber.) The mix was gently heated at temperatures that would first cause the salts to go into solution and then remove the excess water in the batch. A temperature of about 220° F. was held for 28 hours at atmospheric pressure and found adequate to transform the solution into a viscous fiberizable mass. The solid content of the mix was estimated at slightly more than 38% in the unfiberized form but after fiberizing the solid content increased to over 60%. The two salts of zirconium serve different functions. The acetate for example, tends to give the mix fiberizability while the oxychloride helps to reduce any difficulty in removing the water necessary to obtain the proper viscosity. Using acetate alone would result in a solution from which it would be very difficult to remove water without overheating the material near the walls of the heating chamber. Adding the oxychloride reduces the viscosity of the mix, thus allowing evaporation to take place more readily and provide a solution with a higher solid content. The solution was then fiberized by a high velocity stream of air. The collected fibers were transferred immediately into an electric kiln and heated to 1200° F. to transform the glassy fibers into pure $ZrO_2$ containing approximately 7.5% MgO as a stabilizer. It was estimated that such fibers could withstand use temperatures well above 4000° F. without melting.

The following examples of solution preparations suitable to form crystalline fibers in accordance with the invention process are disclosed to permit a better understanding of the invention:

*Example 4.*—$Al_2O_3$ *fibers*

To technical-grade $AlCl_3$ solution of Baumé 32°, 20 to 40 parts of pure aluminum metal is added along with 200 parts water. Scrap aluminum wire having a purity of 99.8% may be used. The mixture is heated to 170 to 210° F. for 2 to 4 hours to dissolve the major part of the aluminum. This temperature is not critical but is the best for speed of reaction. The resulting solution is then screened through a −325 mesh stainless steel cloth, and then concentrated to a density of 1.5–1.7 g./cc. by evaporating off excess water. The solution is then ready for fiberizing. This solution which is extremely stable and water clear, shows no signs of precipitating solids after several months standing.

*Example 5.*—$Al_2O_3$ *fibers*

Variations of Example 4 can be made by starting with 250 parts hydrochloric acid and 40 to 80 parts aluminum metal. The reaction is more vigorous than Example 4 but not dangerous if proper care is taken. The solution is concentrated as described in Example 4 to obtain a solution density of 1.5 to 1.7 g./cc. A viscosity of 100 to 600 poises can thus be obtained. The resulting solution can be modified further by adding 5 to 300 parts per weight of basic aluminum acetate. The acetate is first dissolved in water to help mix with previously prepared solutions. The addition of the acetate tends to produce finer fibers.

*Example 6.*—$MgAl_2O_4$ *fibers*

To the solution described in either Example 4 or 5, enough $MgCl_2 \cdot 6H_2O$ can be added to form a solution that can be decomposed into $MgAl_2O_4$ fibers (magnesium aluminum Spinel). To be more specific, to 100 parts of 32° Baumé solution of $AlCl_3$, 200 parts water, 20 parts aluminum metal and 100 parts technical grade $$MgCl_2 \cdot 6H_2O$$

are combined in a glass beaker. The mixture is heated at 170° F. to 210° F. for 2 to 4 hours, screened, then concentrated to about 1.5 g./cc. by evaporation. The solution which is water clear can be fiberized after cooling. Again the addition of some aluminum acetate (basic) will improve the fiberizability of the mix, but is not essential.

*Example 7.*—$ZrO_2$ *fibers, unstabilized*

To 300 parts of commercial grade zirconium acetate solution containing 22% $ZrO_2$ by weight, 0 to 110 parts of commercial grade $ZrOCl_2 \cdot 8H_2O$ is added and concentrated to a viscous solution by evaporation. The heating is maintained at temperatures below 210° F. to prevent boiling of the solution and excessive loss of the acetate or chloride radical. Once a viscosity of 100 poises or density of 1.65 g./cc. is obtained, the solution is considered ready for fiberizing. This solution is the basic mix for making $ZrO_2$ fibers. However, the fibers when converted to $ZrO_2$ by heating are not stabilized $ZrO_2$.

Example 8.—$ZrO_2$ fibers, stabilized

To 300 parts $ZrOCl_2 \cdot 8H_2O$, 300 parts water and 5 parts magnesium metal are added. The reaction is spontaneous and the Mg is dissolved by the salt of zirconium. The resulting clear solution is then concentrated by evaporation until a viscosity of 50 to 150 poises is obtained (density of about 1.65 g./cc.). Fibers made from the solution will contain approximately 7% MgO which is theoretically enough to promote stabilization of the calcined $ZrO_2$ fiber.

Zirconium oxychloride by itself will not form a stable room temperature fiberizable solution. However, the addition of a small amount of Mg ions transforms the solution into a condition in which it has fair to good stability and fiberizability. Also the Mg metal transforms into MgO on calcining and tends to stabilize the ZrO crystals in the cubic form.

Example 9.—$ZrO_2$ fibers, stabilized

To 300 parts $ZrOCl_2 \cdot 8H_2O$ and 300 parts distilled water, 2 to 6 grams of CaO or MgO are added. (CaO is preferred since this oxide is a better stabilizer for the $ZrO_2$ crystal than MgO). The mixture is heated until the oxide of CaO is completely dissolved and the solution is clear. Then 30 to 100 parts of zirconium acetate solution is added and concentrated to about 1.75 g./cc. This solution is also unique in that the small percentage of the basic oxide such as CaO not only stabilizes the $ZrO_2$ crystal into the cubic form, but it makes it possible to use very small percentages of the acetate to maintain purity and reduce the cost of the resulting fiber. It should also be mentioned that $Ca(OH)_2$ or $Mg(OH)_2$ can be used in place of the CaO or MgO if desired.

Example 10.—$ThO_2$ fibers

To 100 parts $ThCl_2 \cdot 4H_2O$, 200 parts of distilled water and 2 to 15 parts $Th(OH)_4$ are added. The batch is heated to just below its boiling temperature to promote the reaction of the two compounds of thorium. When the reaction is completed, the solution becomes clear and further heating is required to make the solution viscous.

Example 11.—$ThO_2$ fibers

To 100 grams of $ThCl_2 \cdot 4H_2O$ and 200 grams of distilled water, 2 to 6 grams of Mg metal are added. A reaction takes place between the salt and the metal and once the reaction is completed, a viscous fiberizable solution is obtained. The small percentages of MgO present in the fiber will probably not affect the use limit of the $ThO_2$ fiber substantially. I believe that this system of forming a stable viscous solution of thorium salts can be expanded tremendously. $ThCl_4 \cdot 4H_2O$ cannot be transformed by itself into a viscous mix at room temperatures. MgO, $Mg(OH)_2$, $U(OH)_4$, CaO, $Ca(OH)_2$, or other alkaline compounds could be used in place of the magnesium metal.

While in accordance with the provisions of the statutes I have described herein preferred forms of the invention now known to me, those skilled in the art will understand that changes may be made in the process disclosed without departing from the spirit of the invention covered by my claims, and that certain features of the invention may sometimes be used to advantage without a corresponding use of the other features.

What is claimed is:

1. The method of making crystalline fibers which comprises concentrating an aqueous solution consisting of a water soluble inorganic metal salt and water, capable of decomposing to a metallic oxide when calcined to a temperature in the range of 800–2500° F., to a viscosity in the range of 1–1000 poises, fiberizing the viscous solution while at a solids concentration equivalent to less than 50% by weight of the metal oxide and in a space having a relative humidity of 20–30%, drying the fibers so formed, and heating the dried fibers at a temperature in the range of 800–2500° F. until the solvent is eliminated, the salt residue decomposed to a crystalline metallic oxide, and the density of the calcined fibers substantially increased.

2. The method of making crystalline fibers which comprises concentrating an aqueous solution consisting of a water soluble inorganic metal salt and water, capable of decomposing to a metallic oxide when calcined to a temperature in the range of 800–2500° F., to a viscosity in the range of 1–1000 poises, continuously fiberizing a moving stream of the viscous solution while at a solids concentration equivalent to less than 50% by weight of the metal oxide into fibers having a mean diameter from ½ to 20 microns, and heating the fibers so formed at a temperature in the range of 800–2500° F. until the solvent is eliminated, the salt residue decomposed to a crystalline metallic oxide, and the density of the calcined fibers substantially increased.

3. The method of making non-reactive crystalline refractory fibers capable of withstanding temperatures in excess of 2000° F. which comprises concentrating an aqueous solution consisting of a water soluble inorganic metal salt and water, capable of decomposing to a metallic oxide when calcined in an oxidizing atmosphere to a temperature in the range of 800–2500° F., to a relatively stable viscosity in the range of 1–1000 poises, continuously attenuating a moving stream of the viscous solution while at a solids concentration equivalent to less than 50% by weight of the metal oxide and in a space having a relative humidity less than 60% into fibers having a mean diameter less than 20 microns, and heating the fibers so formed in an oxidizing atmosphere at a temperature in the range of 800–2500° F. until the solvent is eliminated, the salt residue decomposed to a crystalline metallic oxide and the calcined fibers sintered to a density of substantially 100%.

4. The method of making crystalline fibers which comprises concentrating an aqueous solution consisting of a water soluble inorganic metal salt and water, selected from the group of sulphates, chlorides, oxychlorides, phosphates, and nitrates of aluminum, beryllium, chromium, magnesium, thorium, uranium and zirconium, and mixtures thereof, to a viscosity in the range of 1–1000 poises, continuously fiberizing a moving stream of the viscous solution while at a solids concentration equivalent to less than 50% by weight of the metal oxide into fibers having a mean diameter from ½ to 20 microns, and heating the fibers so formed at a temperature in the range of 800–2500° F. until the solvent is eliminated, the salt residue decomposed to a crystalline metallic oxide, and the density of the calcined fibers substantially increased.

5. The method of making non-reactive crystalline refractory fibers capable of withstanding temperatures in excess of 2000° F. which comprises concentrating an aqueous solution consisting of one or more water soluble inorganic metal salts and water, capable of decomposing to a metallic oxide when calcined in an oxidizing atmosphere to a temperature in the range of 800–2500° F., and selected from the group of sulphates, chlorides, oxychloride, phosphates, and nitrates of aluminum, beryllium, chromium, magnesium, thorium, uranium and zirconium, to a relatively stable viscosity in the range of 1–1000 poises, continuously attenuating a moving stream of the viscous solution while at a solids concentration equivalent to less than 50% by weight of the metal oxide and in a space having a relative humidity less than 60% into fibers having a mean diameter less than 20 microns, drying the fibers so formed, and sintering the dried fibers in a oxidizing atmosphere at a temperature in the range of 800–2500° F. until the solvent is eliminated, the salt residue decomposed to one or more crystalline metallic oxides and the calcined fibers sintered to a density of substantially 100%.

6. The method of making non-reactive crystalline fibers as claimed in claim 5 which comprises heating the dried fibers in an oxidizing atmosphere at a temperature in the range of 1000–1800° F. until the solvent is eliminated, the salt residue decomposed to one or more crystalline metallic oxides and the calcined fibers sintered to a density of substantially 100%.

7. The method of making non-reactive crystalline refractory fibers as claimed in claim 5 in which the fibers formed are dried at room temperature and the dried fibers are heated in an oxidizing still atmosphere at a temperature in the range of 1000–1800° F. until the solvent is eliminated, the salt residue decomposed to one or more crystalline metallic oxides and the calcined fibers sintered to a density of substantially 100%.

References Cited

UNITED STATES PATENTS 3,082,099  3/1963  Beasley et al. _____ 264—204 X

CARL D. QUARFORTH, *Primary Examiner.*

S. TRAUB, *Assistant Examiner.*